United States Patent
Garcia

(10) Patent No.: US 7,499,188 B2
(45) Date of Patent: Mar. 3, 2009

(54) METHOD AND SYSTEM FOR DISTRIBUTED IMAGE PROCESSING AND STORAGE

(75) Inventor: Robert Garcia, Simi Valley, CA (US)

(73) Assignee: Pickupphotos LLC, Beverly Hills, CA (US)

( * ) Notice: Subject to any disclaimer, the term of this patent is extended or adjusted under 35 U.S.C. 154(b) by 783 days.

(21) Appl. No.: 10/615,682

(22) Filed: Jul. 8, 2003

(65) Prior Publication Data

US 2005/0007625 A1    Jan. 13, 2005

(51) Int. Cl.
G06K 15/00 (2006.01)
G06F 3/12 (2006.01)

(52) U.S. Cl. .................. 358/1.14; 358/1.15

(58) Field of Classification Search .......... 358/1.1, 358/1.9, 1.13, 1.14, 1.15, 1.18, 402; 455/3.01, 455/3.03; 705/26, 51, 80, 400; 709/201, 709/213, 217
See application file for complete search history.

(56) References Cited

U.S. PATENT DOCUMENTS 6,570,640 B1 * 5/2003 Garfinkle et al. ............ 355/40
6,574,373 B1   6/2003 Morba et al.
6,577,311 B1 * 6/2003 Crosby et al. ............... 345/428
6,583,799 B1 * 6/2003 Manolis et al. ............. 715/838
6,738,151 B1 * 5/2004 Kato ......................... 358/1.12
2002/0181012 A1 * 12/2002 Miller et al. ............... 358/1.15

* cited by examiner

Primary Examiner—Gabriel I Garcia
(74) Attorney, Agent, or Firm—O'Melveny & Myers LLP

(57) ABSTRACT

A user processes high resolution digital images at a user computer by converting the high resolution images into low and thumbnail resolution formats and by converting the high resolution images into a JPEG format. The user also enters image related data into the user computer and creates a user database. The processed image data and the image related data are stored in the same database, i.e., a user database, and are transmitted to the host site. At the host site, the processed image data and the image related data are stored in the same database, i.e., a host database. Alternatively, users store a plurality of images in high resolution, low resolution and thumbnail formats at the user computer and upload to the host site those images—in thumbnail and low resolution format—that the user selects. Customers view the selected images at the host site and order desired images. The host site sends an image order to the user computer, and the user computer transmits the ordered images to an image laboratory in high resolution format for printing.

14 Claims, 7 Drawing Sheets

FIG. 4

Create New Event

- Event Name: John's Wedding
- Event Description: Wedding in the park.
- Event Date: 1/2/2003  (format as mm/dd/yyyy)
- Instructions Create New Event

FIG. 5

Add Watermark | Instructions

| Image Categories | No. |
|---|---|
| Ceremony | 9 |
| Reception | 20 |
| Romantics | 11 |
| Uncategorized | 0 |

Drop your image files here

Total Number of Images: 40

B & G Immediate Family
- 093.psd
- 093.psd
- 095.psd
- 110.psd
- 113.psd
- 116.psd
- 119.psd
- 123.psd
- 128.psd
- 170.psd Bridal Party
- 013.psd
- 019.psd
- 138.psd
- 141.psd
- 142.psd
- 143.psd Bride and Bridesmaids
- 005.psd
- 017.psd
- 018.psd
- 020.psd
- 064.psd
- 066.psd
- 073.psd
- 075.psd
- 077.psd
- 079.psd
- 081.psd
- 094.psd
- 100.psd
- 179.psd
- 251.psd
- 274.psd
- 501.psd

METHOD AND SYSTEM FOR DISTRIBUTED IMAGE PROCESSING AND STORAGE

BACKGROUND OF THE INVENTION

1. Field of the Invention

The present invention relates to a method and system for distributed image processing and storage.

2. Description of Related Art

With the advent of digital images, several prior art systems for image processing and storage have burgeoned. The prior art image processing and storage systems have become very popular because they allow photographers to make their images available for viewing to a large number of potential customers that may be located in random locations around the globe. The prior art systems include host sites that offer digital images for viewing by potential customers who may wish to purchase the digital images.

Hundreds of digital images are typically captured at events, such as weddings, by photographers, and the potential customers may have attended the event. The host sites are in communication with image laboratories and customer computers via a communication system, such as the Internet; and, photographer computers are in communication with the image laboratories. In this manner, photographers may send film, if the images were captured on traditional film, or a CD, which includes the digital images, to the image laboratory. If the photographer sent film to the image laboratory, the laboratory would convert the pictures taken on film to digital images. The image laboratory then sends the images to the host site for uploading. In other prior art systems, the photographer computers are in communication with the host site, and the photographers send the digital images to the host site by using the File Transfer Protocol (FTP). The photographers must manually send digital images to the host site, which is a lengthy and cumbersome process that can take as much as thirty hours to complete. The prior art systems impose an undue burden on photographers to upload images because the prior art systems either require photographers to physically ship the captured images to a laboratory for uploading or require photographers to spend a great deal of time to manually FTP digital images to the host site.

After the photographer ships the hundreds of images to the image laboratory, the image laboratory stores the hundreds of digital images, in high resolution format, and uploads the hundreds of digital images, in high resolution format, to the host site. The photographer may then access the host site and select a small subset of the uploaded images that the photographer believes potential customers may select for purchasing. At the host site, the selected images are converted from a high resolution format to a low resolution and/or a thumbnail format and are converted into a JPEG format. The photographer may also crop or rotate the selected images as desired. The small subset of selected and converted images are then made available to customers for viewing. Of the small subset of images, customers choose an even smaller subset for purchasing. The chosen smaller subset of images are then retransmitted, in high resolution format, from the host site back to the image laboratory for printing.

By requiring the image laboratory to store the hundreds of images in a high resolution format, the image laboratory is required to have large storage resources; and, by requiring the image laboratory to send the hundreds of images to the host site, the image laboratory is required to have large bandwidth resources. Further, the host site must also have large storage and bandwidth resources to receive and store the hundreds of high resolution images that are transmitted to the host site from the image laboratory. Moreover, by requiring the images to be converted into low resolution and/or thumbnail formats and into JPEG format at the host site, the host site must have tremendous processing resources to accommodate the conversion of thousands of images that are being transmitted to the host site from several image laboratories. While the image laboratory and the host site must invest in a large amount of storage, bandwidth and processing resources to accommodate uploading and processing of the hundreds of high resolution images, the storage, bandwidth and processing resources of the user computer are being unutilized.

When the processed images are stored at the host site, the images are stored at a remote image file and image related data that describe the images are stored at a host database. Pointers, which indicate where the images are stored, must also be stored at the host database. When a customer wishes to view an image, it sends an image request to the host site. The host site retrieves image related data, which pertains to the requested images, from the host database; and, in a second step, retrieves the requested images from the remote image file. The host site uses the pointers stored in the host database to determine the location of the requested images in the remote image file. To ensure that the pointers indicate the location of the correct image, the integrity of the pointers must constantly be maintained by the host site.

The steps of retrieving pointers from the host database and of retrieving the images from the remote file location are burdensome and, oftentimes, result in incorrect pointers—preventing a database user from viewing the image. Because the prior art systems require such steps, processing power of the host site is wasted and the period of time required for viewers, such as customers and users, to view the images is prolonged.

In sum, although the prior art image processing and storage systems facilitate image viewing, the prior art image processing and storage systems have several inefficiencies. The inefficiencies of prior art systems result in an extra burden for photographers while uploading or sending their images to the host site, a wastage of storage resources at both the image laboratory and the host site, a wastage of processing resources at the host site, an extended delay in the time that images are uploaded onto the host site, and an extended delay in the amount of time it takes viewers to view the images.

As a result, a need remains for an image processing and storage method and system that does not create an extra burden for photographers, a wastage of storage resources, a wastage of processing resources, an extended delay for image uploading, and an extended delay in the amount of time it takes viewers to view images.

SUMMARY OF THE INVENTION

The present invention is directed towards a method and system for distributed image processing and storage that addresses the shortcomings of prior art image processing and storage systems.

Pursuant to a first method and system of the invention, a user, such as a photographer, processes digital images at a user computer. The user enters image related data into the user computer and creates a user database. The processed image data and the image related data are stored in the user database. In one embodiment, the image data is processed by converting the image data into JPEG format, compressing high resolution image data into low resolution image data, and manipulating the image data. The processed image data and the image related data are transmitted to the host site, where the processed image data and the image related data are stored in a host database at the host site. The host site makes the processed images accessible to customers who desire to view and purchase images corresponding to the uploaded image data.

By allowing users to process the images at the user computer, instead of at the host site, processing resources required by the host site are substantially reduced and otherwise unused resources of the user computer are utilized. Further, by storing both the processed image data and the image related data in one host database at the host site, the need for pointers is obviated. Thus, processing needs at the host site are further reduced.

Pursuant to a second method and system of the invention, users store a plurality of images in high resolution, low resolution, and thumbnail formats at the user computer and only upload to the host site those images—in thumbnail and low resolution format—that the user selects. Customers can view the selected images at the host site in thumbnail and low resolution format and order those images that the customers desire. The host site sends an image order to the user computer, and the user computer transmits only those images that are ordered by the customer to an image laboratory in high resolution format for printing. By storing the high resolution images at the user computer, instead of at the host site, and by only transmitting selected images—in thumbnail and low resolution format—from the user to the host site, significant bandwidth and storage resources of the host site are preserved; at the same time, unused bandwidth and storage resources of the user computer are better utilized.

A more complete understanding of the method and system for distributed image processing and storage will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 4 is an image related data entry window pursuant to aspects of the invention;

FIG. 5 is an image transfer window pursuant to aspects of the invention;

DETAILED DESCRIPTION OF THE PREFERRED EMBODIMENT

The present invention is directed towards a method and system for distributed image processing and storage. In particular, the present invention is directed to a system and method that include a user, such as a photographer, who uploads processed image data pertaining to a plurality of images to a host site. Potential customers may view the plurality of images at the host site and may desire to order and pay for a subset of the uploaded images.

Pursuant to a first aspect of the invention, a user, such as a photographer, may automatically process digital images at the user computer and automatically upload the images to a host site. When the images are uploaded to the host site, the images are immediately accessible to customers who desire to view and purchase the uploaded images. By allowing users to process the images at the user computer, instead of at the host site, processing resources required by the host site are substantially reduced and otherwise unused resources of the user computer are utilized.

Pursuant to a second aspect of the invention, users, such as photographers, store a plurality of images in high resolution, low resolution and thumbnail formats at the user computer and only upload to the host site those images—in thumbnail and low resolution format—that the user selects. Customers can view the selected images at the host site and order those images that the customers desire. The host site can then send an image order to the user computer, and the user computer can transmit only those images that are ordered by the customer to an image laboratory in high resolution format for printing. By storing the high resolution images at the user computer, instead of the host site, and by only transmitting selected images—in thumbnail and low resolution format—from the user to the host site, significant bandwidth and storage resources of the host site are preserved; at the same time, unused bandwidth and storage resources of the user computer are better utilized.

Figure 1:
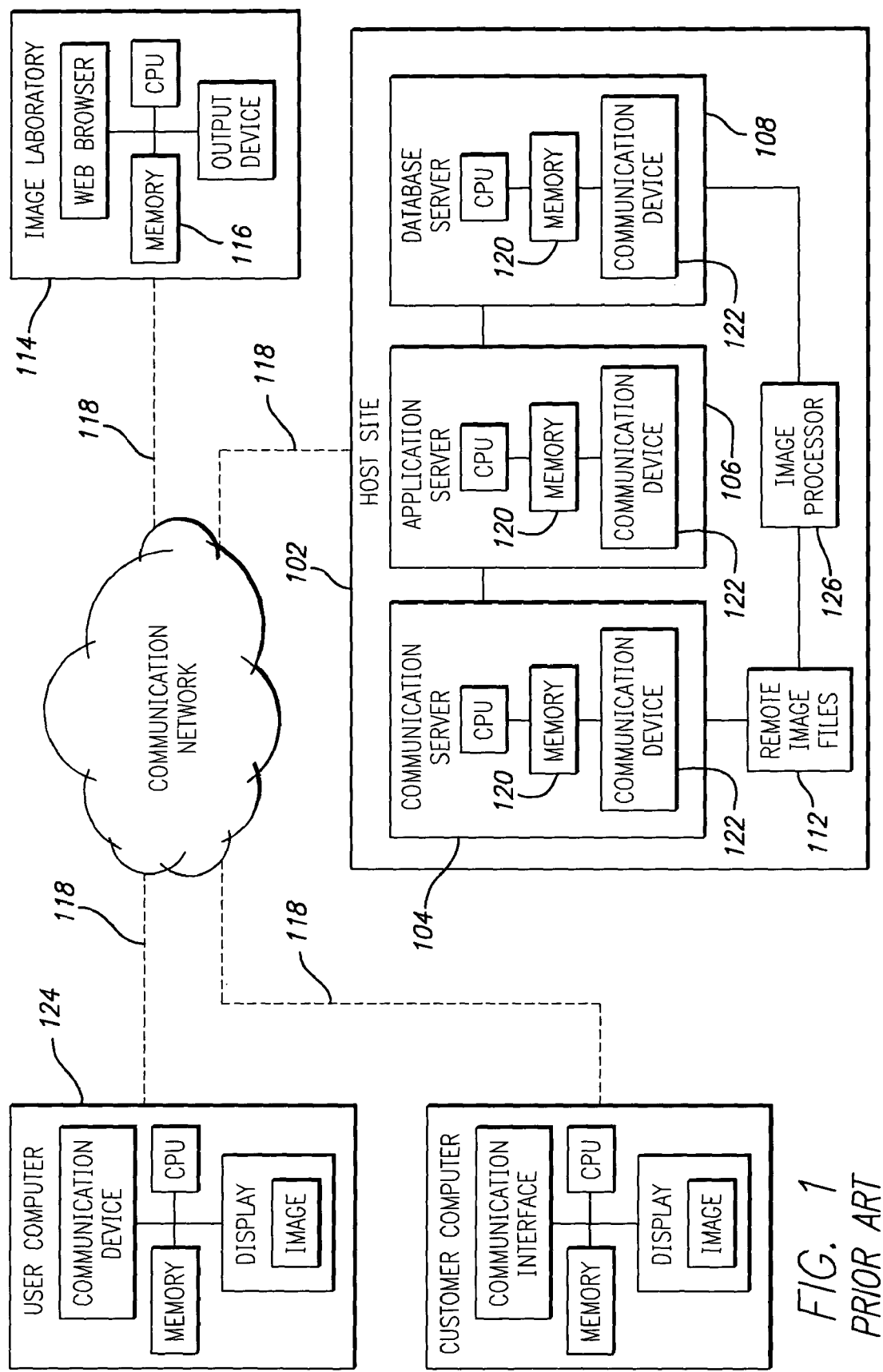
FIG. 1 is a schematic diagram of a prior art system of image processing and storage.

As shown in FIG. 1, prior art systems require photographers to either send their film or digital images to an image laboratory 114, which sends the digital images to the host site 102, and if film is provided, converts the images on film to digital images prior to sending. In other prior art systems, a photographer may directly send digital images to the host site 102, but the photographer must learn the File Transmission Protocol (FTP) to transmit the images to the host site. Learning the FTP may be very burdensome to photographers, many of which are not well versed in computers or computer programming. Thus, by requiring photographers to send images to a laboratory or to learn the FTP protocol, prior art methods impose an undue burden on photographers.

Prior art host sites 102 are typically in communication with an image laboratory 114, and the photographer provides all of the images of an event, in high resolution format, to the image laboratory. A photographer can capture hundreds of images during an event in an effort to capture the most aesthetically pleasing images of the event, and the photographer provides these hundreds of images to the image laboratory 114. The image laboratory 114 temporarily stores and sends all of the high resolution images to the host site 102, requiring the image laboratory to make substantial investments in memory 116 to store the high resolution images and in communication links 118, such as T1 lines, to have adequate bandwidth to send the high resolution images to the host site 102. Typically, after the image laboratory 114 sends the high resolution images to the host site 102, the image laboratory 114 deletes the images so that it has sufficient memory to accommodate images from other photographers who wish to upload images to the host site.

The host site 102 must have sufficient memory 120 to store all of the high resolution images that are received from different image laboratories. The host site must also have a communication device 122 that can accommodate the vast amount of data, which can be tens of thousands of images in high resolution format, that is being received from several image laboratories. The photographer accesses the host site 102 at a later time and, generally, selects for customer viewing only a small subset of the hundreds of images that were transmitted to the host site. Of the small subset that is selected by the photographer, even a smaller subset is ordered by potential customers, and this smaller subset of high resolution images is then transmitted from the host site 102 to the image laboratory 114 for printing.

In other prior art systems not shown, the host site 102 does not have a communication device 122, and the image laboratories 114 must physically ship the digital images to the host site 102. The high resolution images must still be stored at the host site memory 120, causing the undesirable memory requirements described above. Further, a substantial lag time is created from the time the host site receives the high resolution images to the time the images are actually uploaded to the host site. The lag time is caused by backlogs of images that are received at the host site from other image laboratories and because agents of the host site must physically upload the images to the host site.

The prior art system wastes substantial storage and bandwidth resources at both the image laboratory 114 and the host site 102, because only a few of the high resolution images that are transmitted to the host site are selected by the photographer, and those few are only made available for viewing in thumbnail or low resolution format, not high resolution format. As a result, a large number of images in high resolution format are unnecessarily stored at the image laboratory 114, transmitted from the image laboratory to the host site 102, and stored at the host site. Further, additional images that were made available for viewing by the photographer and that were selected for purchasing by a customer must be retransmitted, in high resolution format, back to the image laboratory 114. Thus, additional bandwidth is wasted in the retransmission, back to the image laboratory 114 from the host site 102, of the selected high resolution images.

After the images are stored at the host site 102, the images must be processed. The images are initially processed at the host site 102 by at least one image processor 126. Other prior art systems (not shown) include several image processors to accommodate the thousands of images that must be processed at the host site 102 every day. The image processor 126 converts the images to a predetermined image format, which is usually a Joint Photographic Expert Group (JPEG) format. The image processor 126 must also compress the images to thumbnail and low resolution formats so that customers cannot download the high resolution images without paying for them and so that the images can be downloaded faster. Further, the images may also be watermarked. After the processing is complete, the images are stored in a remote image file 112 and are available for viewing by the photographers. Because a host site typically must process thousands of images on a daily basis, a significant amount of processing power is expended at the host site to process the images.

After the photographers can view the images at the host site, the photographers generally categorize the images into various sub-events, such as a reception that took place during the event, and enter image related data, such as the name and date of the event. During this time, the host site 102 updates a host database to include the image related data and creates a pointer linking the appropriate image related data to the actual image, which is stored in the remote image file 112. Creating and maintaining accurate pointers to the correct image consumes processing power at the host site, prolongs the time to make the images ready for viewing and is another step during which additional errors may arise.

The photographer must also access the host site 102 via the user computer 124 to process the images by manipulating them on-line. For example, the photographer may manipulate the images by rotating or cropping the images. After the photographer has processed the images, the images must be resaved to the remote image file 112, and care must be taken to ensure that the integrity of the pointer to the image has not been compromised in the process. Processing the images on-line and ensuring that the pointer to the resaved image is correct also unnecessarily wastes host site 102 processing resources. It should also be noted that, while substantial amounts of storage and processing resources at the host site are being consumed, storage and processing resources of the user computer 124 are being largely under-utilized.

After the images are made available for viewing at the host site 102, the customers download the images, in thumbnail and low resolution format, for viewing. Typically, a customer accesses the host site 102 and sends a user id to the host site to view images of an event. As shown in FIG. 1, the host site 102 typically has communication 104, application 106 and database 108 servers. The user id is received by the communication server 104 and sent to the database server 108, which uses the user id to retrieve the data that the customer has access to. The data is sent to the application server 106 in a raw format, and the application server 106 manipulates the information into a format, such as a HyperText Markup Language (HTML) format, that is comprehendible by the communication server 104. The communication server 104 sends the information as an HTML document to the customer computer 110.

The HTML document typically includes tags that indicate that an image is linked to the HTML document. A browser of the customer computer 110 receives the HTML document and, if there is an image tag, sends a request to the host site 102 for the image. The request is received at the host site 102, and the communication server 104 sends a message to the database server 108, requesting pointers to the images requested by the customer. The database server sends the pointers to the communication server 104, and the communication server 104 accesses image data for the requested images from the remote image files 112 based on the pointers. The communication server 104 then adds a JPEG HyperText Transport Protocol (HTTP) header to the image data so that the browser of the customer computer 110 can properly display the image. The image data is then sent to the customer computer.

The steps of requesting pointers from the database servers to access the images and of retrieving the image data from the remote file location are burdensome and, oftentimes, result in incorrect pointers—preventing a database user from viewing the image. Because the prior art systems require such steps, processing power of the host site is wasted and the period of time required for viewers, such as customers and users, to view the images is prolonged.

In sum, although prior art image processing and storage systems allow for customers to view images captured during an event, the prior art image processing systems also result in the wastage of processing and storage resources at the image laboratory 114 and the host site 102 and in a protracted time for image downloading from the host site 102. These and other shortcomings of prior art systems are remedied by distributed image processing and storage methods and systems of the invention.

Figure 2:
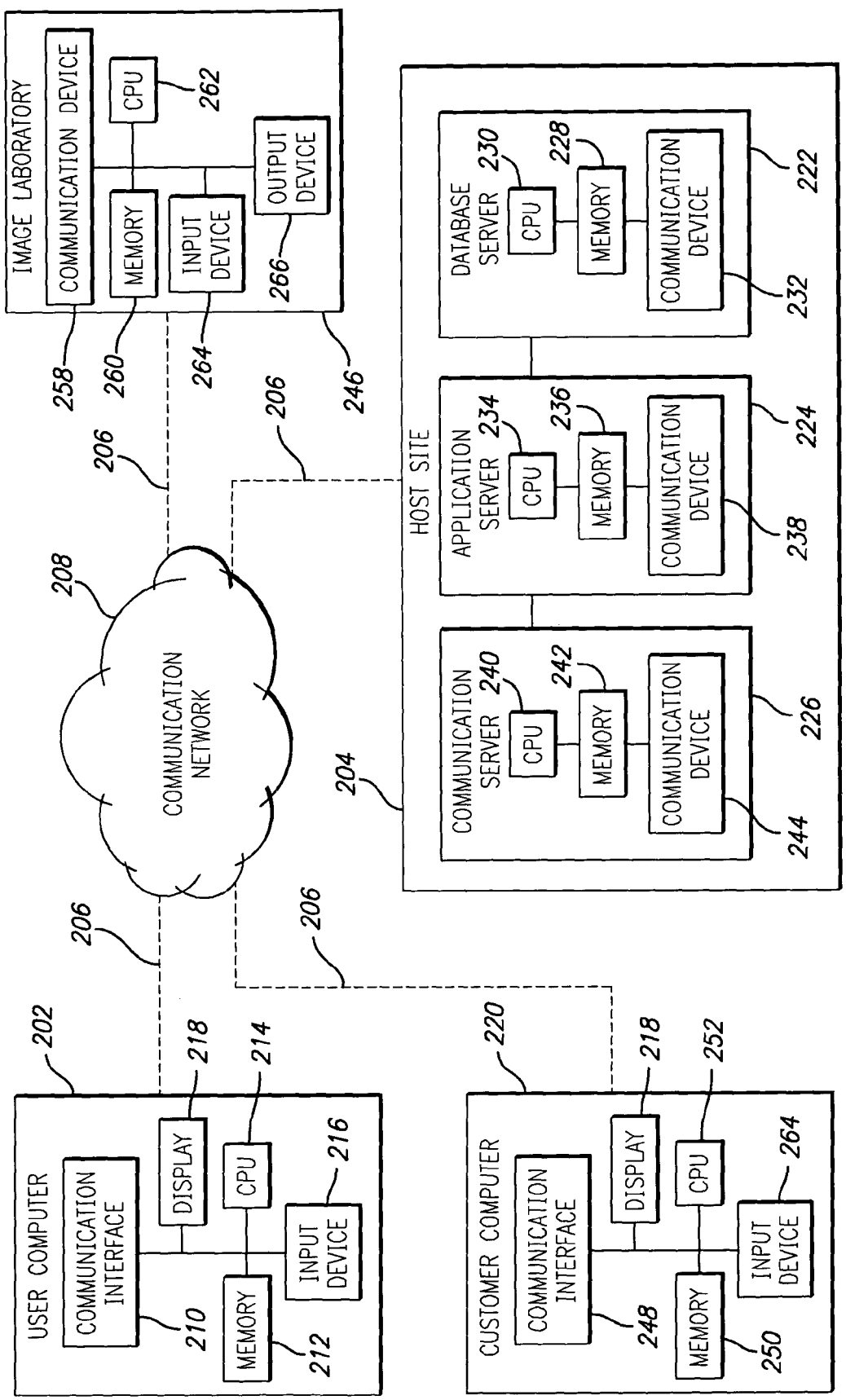
FIG. 2 is a schematic diagram of a system of distributed image processing and storage pursuant to aspects of the invention.

FIG. 2 shows a first embodiment of a distributed image processing and storage system pursuant to aspects of the invention. A user computer 202 is in communication with a host site 204 via communication links 206 and a communication network 208, such as a Wide Area Network (WAN). In one embodiment, the WAN is the Internet.

The user computer 202 includes a communication device 210, memory 212, processing unit 214, an input device 216, and a display 218. The communication device 210 is configured to transmit and receive data via the communication network 208. The memory 212 is configured to store data such as a user database that includes image data stored in the form of binary large objects ("blobs") and image related data. The processing unit 214 is configured to create a user database based on image related data entered by a user via the input device 216 and process image data. The display 216 is configured to display data, and the input device 216 comprises, for example, a keyboard, a mouse and a CD-ROM drive. The user may download digital images into the user computer 202 via the CD-ROM drive and may input image related data via the keyboard. The image related data can include, for example, a description of a particular image, the date the image was captured, pricing for the image, etc.

In one embodiment, the user computer 202 and the customer computer 220 (described below) include a computing device running on any operating system (e.g., Macintosh™, Unix™, Windows 95™, Windows 2000™, etc.) that allows the user to interactively browse websites. The user computer can be, for example, a personal computer (PC) that includes a Web browser application executing thereon (e.g., Microsoft Internet Explorer*υ* or Netscape Communicator™).

In the embodiment shown in FIG. 2, the host site 204 includes a database server 222, an application server 224 and a communication server 226. The database server includes a memory 228, a processing unit 230 and a communication device 232. The database server communication device 232 is configured to receive data from and transmit data to the application server 224. The database server memory 228 includes a central database having image data, in the form of blobs, and image related data. The image data typically corresponds to a plurality of images captured at an event. The database server processing unit 230 is configured to retrieve data stored in the database server memory 228 based on input data received from the application server 224. The database processing unit 230 may utilize a database engine, such as an SQL Server™ engine from Microsoft Corporation or an Oracle™ database engine, to search for and retrieve the image and image related data. Search engines typically perform searches by operating on a string of characters, known as a "query string." A query string is coded according to a set of rules determined by the database engine and/or a user interface between the database engine and the user.

The application server 224 includes a processing unit 234, a memory 236 and a communication device 238. The application server processing unit 234 is configured to manipulate and process data retrieved by the database server 222. For example, the application server may format the information received from the database server 222 by organizing the data in tables, applying a color scheme to text, adding a Joint Photographic Expert Group (JPEG) HyperText Transport Protocol (HTTP) header to image data blobs received from the database server 222, and by converting the data into a format that is comprehendible by the communication server 226. The format is typically an HTML format but may also be other formats, such as an Extensible Mark-Up Language (XML) or text format. The application server memory 236 is configured to temporarily store the manipulated data; and, the application server communication device 238 is configured to send the manipulated data to the communication server 226 and to send input data to the database server 222.

The communication server 226 includes a processing unit 240, a memory 242 and a communication device 244. The communication device 244 sends requests for data to the application server 224 based on input received from requesting entities, such as users 202 and customers 220; and, the communication server communication device 244 also sends the manipulated data received from the application server 224 to the requesting entity using HTTP. The manipulated data can be, for example, HyperText Markup Language (HTML) documents and image data. Note that the host 226, application 224 and database 222 servers may either be three separate components, as shown in FIG. 2, or the host, application and database servers can be a unitary component (not shown), such as a personal computer.

The embodiment shown in FIG. 2 also includes a customer computer 220 and an image laboratory 246, both in communication with the communication network 208 via communication links 206. The customer computer 220 includes a communication device 248, a memory 250, a processing unit 252, an input device 254 and a display 256. The customer computer 220 sends requests to view images pertaining to an event to the host site 204.

Data is generally requested from the host site 204 by a user 202 or customer 220 by communicating an HTTP request from a browser application residing at the user or customer computer. The HTTP request may include, for example, a customer identifier, such as a user id and password, an indication of which images the customer or user wishes to view, and image order data. The HTTP request is routed to the communication server 226 via the communication network 208. The communication server 226 then retrieves the requested data from the database server memory 228 and communicates the data across the communication network 208 to the user 202 or customer 220 computer. The data may be communicated in the form of plural message packets as defined by standard protocols, such as the Transport Control Protocol/Internet Protocol (TCP/IP), although it should be appreciated that communication using other protocols would be within the scope of the invention.

The image laboratory includes a communication device 258, a memory 260, a processing unit 262, an input device 264, and an output device 266, such as a printer. The image laboratory communication device 258 is configured to receive image data, such as blobs—in high resolution format—from the user computer; the image laboratory memory 260 is configured to store the image data; and, the image laboratory output device 266 is configured to print the image data in a high resolution format.

Figure 3:
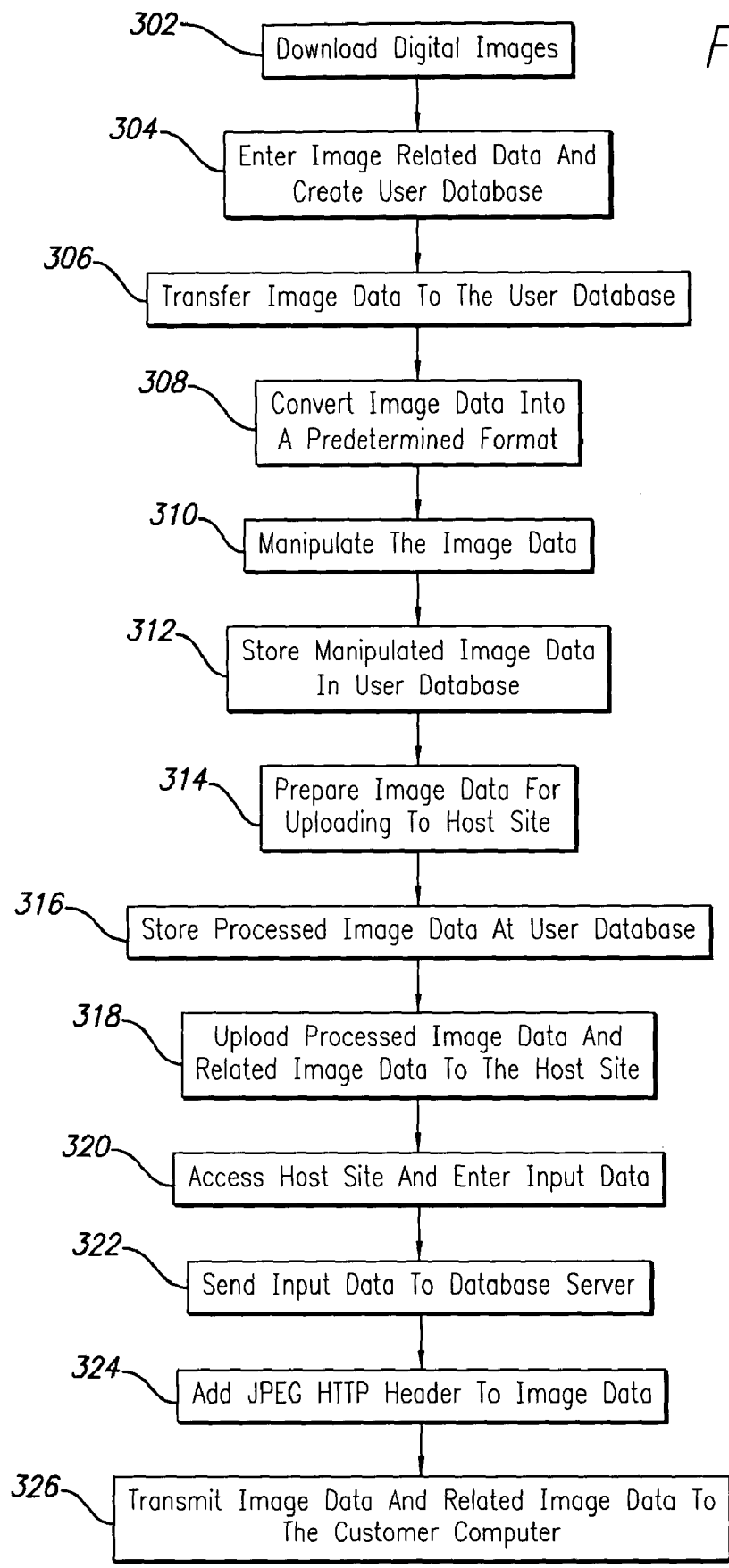
FIG. 3 is a flow diagram of a first method pursuant to aspects of the invention.

FIG. 3. shows a flow diagram of a first method for distributed image processing pursuant to a first aspect of the invention. At step 302, a user downloads digital images into the user computer 202 by, for example, downloading images directly from a digital camera or from a CD having digital images stored thereon. Typically, the user downloads the images in high resolution format to the user computer memory 212. At step 304, the user creates a user database and enters image related data into the user database. In one embodiment, as shown in FIG. 4, the user is prompted to enter image related data into an image related data window 402 shown on the display 218 of the user computer, and, after the image related data is entered, the user computer processing unit 214 automatically creates a user database that includes the image related data. The image related data can include, for example, the name of the event 404 during which the images were captured, such as "John's Wedding," a description 406 of the event, a sub-category 504 (shown in FIG. 5) of the event, such as "reception," the date 408 of the event, the name of the user or photographer who captured images of the event (not shown), and pricing and delivery options of the images (not shown).

At step 306, the user transfers the images stored in the memory of the user computer to the user database and, at step 308, processes the images by converting the images from whichever format they were into a predetermined format. In one embodiment, a user may request automatic processing. For example, as shown in FIG. 5, the user may request automatic processing by selecting image icons 502 on the user computer memory 212 by "clicking" on the image icons 502, and "dragging" and "dropping" the image icons (the image icons that are being dragged are marked by numeral 506) into the event and category 504 that the images pertain to. When the images are "dropped" into the appropriate event and category 504, the user computer processing unit 214 automatically converts the images to the predetermined format, which is a JPEG format. The images are stored as blobs with the image related data in the user database.

Figure 6:
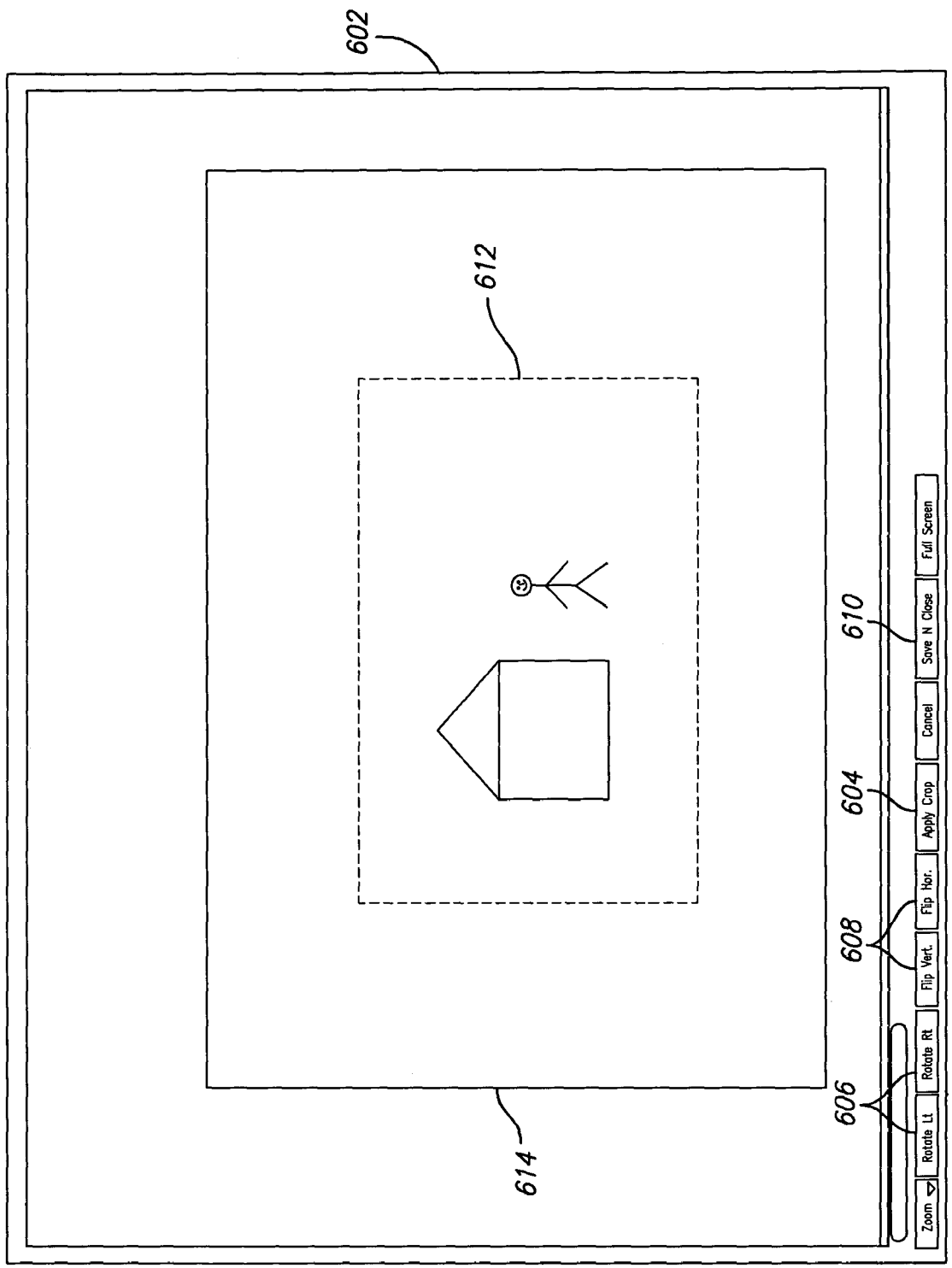
FIG. 6 is an image data manipulation window pursuant to aspects of the invention.

At step 310, the user processes the images by manipulating them. For example, as shown in window 602 of FIG. 6, the user may draw a cropping window 612 around portions of an image 614 and press the crop button 604 to remove those portions of the image that are unwanted. The user may also press the rotate button 606 or the flip button 608 to rotate or flip, respectively, the image on the user computer 202. At step 312, the user stores the processed images as blobs in the user database. In one embodiment, as shown in FIG. 6, the user may store the images in the user database by pressing the save button 610.

Figure 7:
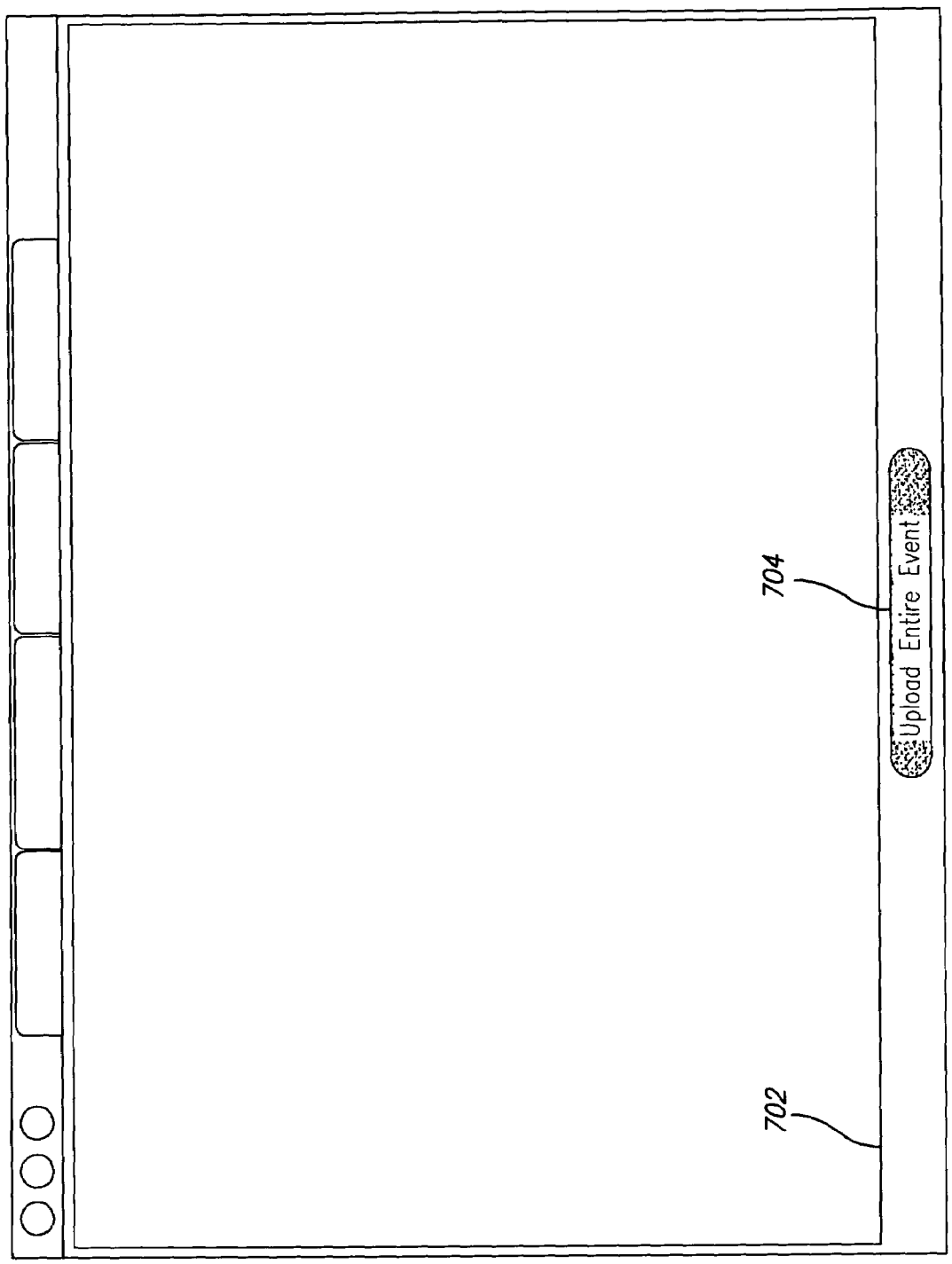
FIG. 7 is a processed image data and image related data uploading window pursuant to aspects of the invention; and, FIG. 8 is a flow diagram of a second method pursuant to aspects of the invention.

At step 314, the user processes the images by preparing the images for uploading. For example, the user scales the images to predetermined pixel dimensions and compresses the high resolution images into thumbnail and low resolution formats of the images. In one embodiment, the user may request automatic processing by selecting the upload button 704 (FIG. 7). When the "upload" button is selected, the user computer processing unit automatically scales the images and compresses the high resolution images into thumbnail and low resolution formats of the images. In other embodiments not shown, watermarks may also be added to the images. At step 316, the processed images are stored as blobs on the user database. If automatic processing is requested, the processed images may be automatically stored as blobs when the upload button 704 is pressed.

By allowing for processing of the images at the user computer 202, instead of at the host site, the images can be processed immediately by the user shortly after the images have been captured; and, as a result, the images can be available for viewing at the host site 204 shortly after the event during which the images were captured. Further, by allowing for processing of the images at the user computer 202, instead of at the host site 204, the processing requirements of the host site are substantially reduced; and, an otherwise unutilized processing resource, the processing resources of the user computer, are better utilized.

It should be noted that the term "processing" has been used to describe the conversion of image formats, the manipulation of image data, and the preparation of image data for posting on the web. The term "processing" is to be construed to include at least one or more of the conversion, manipulation and preparation of image data steps.

At step 318, the user uploads the processed image data and image related data to a host database residing at the host site 204. The user communication device 218 sends the processed images and image related data along with other instructions that inform the database server 222 where to insert the uploaded processed image data and image related data into the host database. In the first embodiment, as shown in the upload window 702 of FIG. 7, the user computer processing unit 214, memory 212 and communication device 210 all cooperate to automatically upload the processed image data, the image related data and other instructions to the host site 204 when the user presses the 'upload' button 704.

By storing both the processed image data and the image related data in the same database, i.e., the user database, and by sending both the processed image data and the image related data to the same database, i.e., the host database, the processed image data and image related data is uploaded in an efficient manner. In prior art image databases, the image data is stored in a remote file 112 and the image related data is stored in the database. The database also includes a pointer to the location of the image within the remote file 112. Creating and maintaining the pointer to the correct file location is burdensome and, oftentimes, results in incorrect pointers—preventing a database user from viewing the image. The added burdens of maintaining pointers and the problems of incorrect pointers are alleviated by maintaining the image data and the image related data in the same location, as provided in the invention. Thus, uploading of the images from the user computer 202 to the host site 204 is facilitated pursuant to aspects of the invention.

After the user 212 uploads the images to the host site 204, at step 320, a customer may view the images by accessing the host site and entering input data, such as a customer identifier. After the customer has accessed the host site and sent additional input data, indicating which image the customer wishes to view, at step 322, the communication server 226 sends the input data to the application server 224. The application server 224 sends the input data to the database server 222, which retrieves the image data, in blob format, for the requested image. The image data is sent back to the application server 224, which adds a JPEG HTTP header to the image data, at step 324. At step 326, the communication server 226 forwards the image data to the customer computer 220, and the customer computer 220 may use a browser or other application to view the image.

Adding the JPEG header to the image data, in blob format, allows the customer computer 220 to view the image in a fast manner. Without the header, the customer computer would not know that the data received is an image in JPEG format and would not be able to display the image. Further, in prior art methods, after a browser requested an image from the host site, the communication server must obtain an image pointer from the database server 108 (via the application server 106), retrieve the image from the remote image file 112, add a JPEG HTTP header, and then send the image to the requesting entity. The present invention obviates the need for the communication server to use a pointer to retrieve the image from the remote file location and to add the JPEG header, which is added by the application server. Thus, the present invention allows users and customers to view requested images faster than is possible in prior art methods and also preserves processing resources at the host site.

Figure 8:
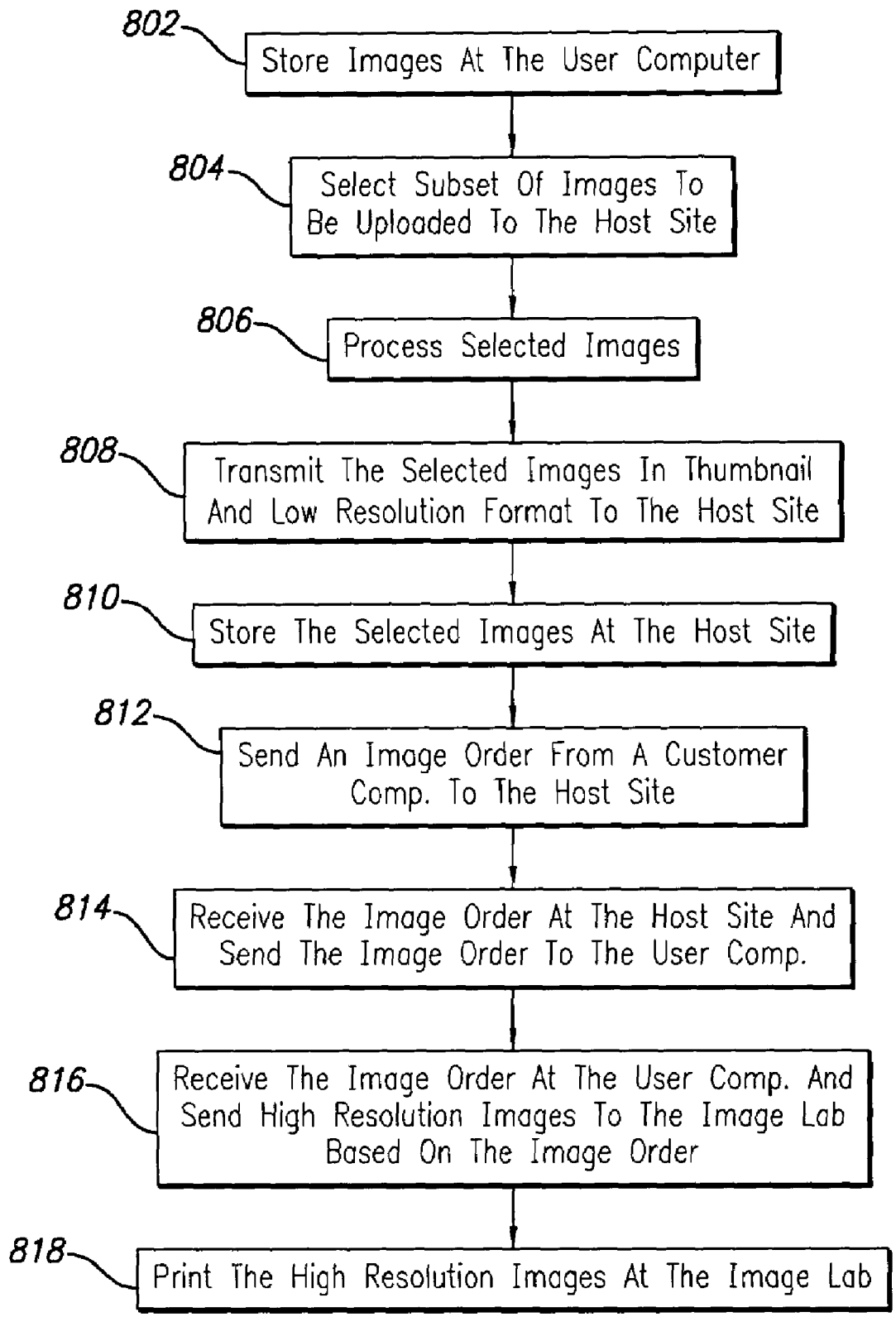

FIG. 8 shows a flow diagram of a second method for distributed image storage pursuant to a second aspect of the invention. At step 802, a plurality of images are stored in high resolution format at the user computer 202 by the user, such as a photographer. If the photographer initially captured the images using a digital camera, the photographer may simply download the images to the user computer 202. If, on the other hand, the photographer captured the images on film, the photographer may send the film to an image laboratory 246 that will convert the images into digital format and store the images on media, such as a CD. The photographer may then download the images, as saved in digital format on the CD, to the user computer 202.

At step 804, the user selects a subset of the plurality of images that the user wishes to upload to the host site 204. The user may either maintain the unselected images in the memory of the user computer or on a CD; alternatively, the user may delete the unselected images. At step 806, the user processes the images by, for example, converting the images to a predetermined format, such as a JPEG format, cropping or rotating the images, creating thumbnail and low resolution formats of the images, or adding a watermark to the images. The user also saves the selected images, after they have been processed, at the user computer 202. At step 808, the user uploads the selected images to the host site 204 in thumbnail and low resolution format. Note that in other embodiments not shown, the user may wish to perform some of the processing functions, such as converting the images to a predetermined format, cropping or rotating the images, or adding a watermark after the images have been uploaded to the host site 204. At step 810, the uploaded images are stored at the host site 204.

By storing the high resolution images at the user computer 202 and only uploading to the host site 204 those images that the photographer selects, in thumbnail and low resolution format, significant bandwidth and memory resources of the host site are conserved. Unlike prior art systems, the host site 204 and the image laboratory 246 need not accommodate the hundreds of high resolution images of an event that the user captured during an event and has no intention of making available for viewing. Indeed, in methods and systems pursuant to the second aspect of the invention, the image laboratory 246 is not even involved in the process of uploading images, thus significantly reducing the storage and bandwidth requirements of the image laboratory; and, the host site 204 only need accommodate a small subset (those images selected by the user) of the hundreds of images captured during an event, and the host site only need accommodate that small subset in a thumbnail and/or low resolution format. As a result, significant bandwidth and storage requirements of the image laboratory 246 and host site 204 are alleviated pursuant to the second aspect of the invention.

At step 812, a customer sends an image order to the host site 204, and at step 814, the host site receives the image order and sends the image order to the user computer. At step 816, the user computer 202 receives the image order and sends those high resolution images to the image laboratory that were ordered by the customer, as indicated by the image order. At step 818, the image laboratory 246 prints the high resolution images that were ordered by the customer and sends the prints to the customer.

Because the user computer 202 stores the high resolution images, only those high resolution images that are ordered by the customer 220 are transmitted to the image laboratory, and the ordered images are only transmitted once to the image laboratory 246. Thus, significant storage and bandwidth resources are preserved, as compared to prior art systems. In the prior art systems, all of the images captured during an event are transmitted, in high resolution format, from the image laboratory 114 to the host site 102, and images ordered by customers are again retransmitted from the host site 102 back to the image laboratory 114.

Having thus described a preferred embodiment of a method and system for distributed image processing and storage, it should be apparent to those skilled in the art that certain advantages of the within system have been achieved. It should also be appreciated that various modifications, adaptations, and alternative embodiments thereof may be made within the scope and spirit of the present invention. For example, a system using the Internet has been illustrated, but it should be apparent that the inventive concepts described above would be equally applicable to other communication networks, such as local area networks comprising a closed community of users and customers. The invention is further defined by the following claims.

What is claimed is:

1. A method for distributed image processing, comprising:
   receiving both image data and image related data regarding user images from a user computer, the image data being pre-processed by a user on the user computer and in a relatively low resolution format, the image related data comprising an image description, an image capture date, and an image price;
   storing the received image data and the received image related data in a host database;
   providing a customer computer access to the stored image data and the stored image related data;
   receiving an image request for at least a subset of the user images from the customer computer;
   adding a JPEG header to the stored image data for each of the requested user images to generate modified image data for each of the requested user images;
   transmitting both the modified image data and the stored image related data for each of the requested user images to the customer computer;
   receiving an image order from the customer computer, the image order identifying a desire to purchase at least one of the requested user images;
   in response to the image order, receiving the at least one of the requested user images from the user computer in a relatively high resolution format; and
   transmitting
   the at least one of the requested user images in the relatively high resolution format to an image laboratory.

2. The method of claim 1, wherein the step of receiving the at least one of the requested user images from the user computer in a relatively high resolution format, further comprises the user computer periodically polling the host computer to determine whether the image order has been received by the host computer and to receive identifying information of the at least one of the requested user images, the identifying information being used by the user computer to provide the at least one of the requested user images in the relatively high resolution format to the host computer.

3. The method of claim 2, wherein the step of transmitting the at least one of the requested user images in the relatively high resolution format to an image laboratory, further comprises an image laboratory computer periodically polling the host computer to determine whether the at least one of the requested user images in the relatively high resolution format has been received by the host computer and, if so, receiving the at least one of the requested user images in the relatively high resolution format.

4. A method for distributed image processing, comprising:
   receiving both image data and image related data regarding user images from a user computer, the image data being manipulated by a user on the user computer and in a relatively low resolution format, and the image related data comprising at least one of an image description, an image capture date, and an image price;
   storing the received image data and the received image related data in a host database;
   sending at least a portion of the stored image related data to a customer computer;
   receiving an image request for at least a subset of the user images from the customer computer;

changing the format of the requested user images by adding a JPEG header to the stored image data for each of the requested user images to generate modified image data for each of the requested user images;

receiving an image order from the customer computer, the image order identifying at least one of the requested user images;

receiving in response to the image order the at least one of the requested user images from the user computer in a relatively high resolution format; and transmitting the at least one of the requested user images in the relatively high resolution format to a remote location.

5. The method of claim 4, wherein transmitting the at least one of the requested user images in the relatively high resolution format comprises transmitting the at least one of the requested user images in the relatively high resolution format to an image laboratory.

6. The method of claim 4, wherein transmitting the at least one of the requested user images in the relatively high resolution format comprises transmitting the at least one of the requested user images in the relatively high resolution format to an image output device.

7. The method of claim 4, wherein transmitting the at least one of the requested user images in the relatively high resolution format comprises transmitting the at least one of the requested user images in the relatively high resolution format to the customer computer.

8. The method of claim 4, wherein the step of receiving in response to the image order the at least one of the requested user images from the user computer in a relatively high resolution format, further comprises the user computer polling the host computer to determine whether the image order has been received by the host computer and to receive identifying information of the at feast one of the requested user images, the identifying information being used by the user computer to provide the at least one of the requested user images in the relatively high resolution format to the host computer.

9. The method of claim 5, wherein the step of transmitting the at least one of the requested user images in the relatively high resolution format to an image laboratory, further comprises an image laboratory computer polling the host computer to determine whether the at least one of the requested user images in the relatively high resolution format has been received by the host computer.

10. A system for distributed image processing, comprising:

a user computer, the user computer storing image data regarding user images manipulated by a user with the user computer, the image data being in both relatively low and relatively high resolution formats;

at least one customer computer; and a host site in communication with the user computer, the at least one customer computer, and an image laboratory; wherein the host site is adapted to:

receive both the image data in the relatively low resolution format and image related data from the user computer, the image related data comprising at least one of an image description, an image capture date, and an image price;

store the received image data and the received image related data in a host database;

provide the at least one customer computer access to the stored image data and the stored image related data receive an image request for at least a subset of the user images from the at least one customer computer;

add a JPEG header to the stored image data for each of the requested user images to generate modified image data for each of the requested user images;

receive an image order from the at least one customer computer, the image order identifying a desire to purchase at least one of the requested user images;

receive the at least one of the requested user images from the user computer in the relatively high resolution format; and transmit the at least one of the requested user images in the relatively high resolution format to at least one of the at least one customer computer and an image laboratory.

11. The system of claim 10, wherein the host site is further adapted to transmit the at least one of the requested user images in the relatively high resolution format to both the at least one customer computer and the image laboratory.

12. The system of claim 10, wherein the user computer is adapted to periodically poll the host site to determine whether the image order has been received by the host computer and to receive identifying information of the at least one of the requested user images, the identifying information being used by the user computer to provide the at least one of the requested user images in the relatively high resolution format to the host site.

13. The system of claim 10, further comprising an image laboratory computer, the image laboratory computer being adapted to periodically poll the host site to determine whether the at least one of the requested user images in the relatively high resolution format has been received by the host site.

14. The system of claim 12, further comprising an image laboratory computer, the image laboratory computer being adapted to periodically poll the host site to determine whether the at least one of the requested user images in the relatively high resolution format has been received by the host site and, if so, to request the at least one of the requested user images in the relatively high resolution format.

* * * * *